United States Patent
Powell

[11] Patent Number: 5,703,689
[45] Date of Patent: Dec. 30, 1997

[54] OPTICAL SPECTROMETER

[75] Inventor: Ronald Allan Powell, Redwood City, Calif.

[73] Assignee: Varian Associates, Inc., Palo Alto, Calif.

[21] Appl. No.: 664,284

[22] Filed: Jun. 11, 1996

[51] Int. Cl.$^6$ .................................................. G01N 21/00
[52] U.S. Cl. ............................................. 356/432; 356/326
[58] Field of Search .......................... 356/432, 432 T, 356/446, 417, 445, 326, 419, 301; 374/161

[56] References Cited

U.S. PATENT DOCUMENTS

| 3,714,430 | 1/1973 | Finvold et al. . | |
|---|---|---|---|
| 3,914,055 | 10/1975 | Wolga et al. | 356/301 |
| 4,338,516 | 7/1982 | Sharma . | |
| 5,118,200 | 6/1992 | Kirillov et al. . | |
| 5,159,410 | 10/1992 | Pollak et al. | 356/432 |
| 5,213,985 | 5/1993 | Sandroff et al. . | |

OTHER PUBLICATIONS

D. Kirillov et al., "Laser Beam Heating And High Temperature Band–to–band Luminescence of GaAs and InP", *J. Appl. Phys.* 54 (7): Jul. 1983, pp. 4104–4109.

*Primary Examiner*—K. Hantis
*Attorney, Agent, or Firm*—Marilyn Glaubensklee; Edward Berkowitz

[57] ABSTRACT

A broadband optical detector is disposed to measure the total intensity $I(\lambda, \alpha)$ attributed to a portion of the optical spectrum passed by a sharp bandgap optical transmission element as the bandgap is caused to translate over a desired wavelength interval by a band gap control parameter, T. The differential spectrum of the incident optical radiation is recovered by the differentiation of $I(\lambda, \alpha)$ in respect to the parameter T.

4 Claims, 3 Drawing Sheets

OPTICAL SPECTROMETER

FIELD OF THE INVENTION

This invention relates to optical spectrometry, and more particularly to method and apparatus for determining spectral intensity of radiation incident upon a material which is characterized by a temperature dependent band-edge shift property.

Background of the Invention

The acquisition of an optical spectrum, e.g. radiation intensity as a function of energy or wavelength, is commonly obtained with instruments which utilize an optically dispersive element, e.g. a prism or a grating, capable of dispersing optical radiation spatially in direct correspondence to the wavelength (or frequency). In this way, those wavelengths present in the incident beam are spatially segregated for registration on a suitable recording medium, e.g. charge coupled device (CCD) or photodiodes, thereby obtaining the distribution of incident optical wavelengths directly.

These instruments form an image on a focal plane typically with the aid of an optical system, e.g. lenses, or gratings, operating in cooperation with other optical elements, all of which must be constructed and maintained in precise spatial relationship for satisfactory operation of the instrument.

Typically, such dispersive element(s) require a relatively spatially expansive focal plane in order to accommodate a wide spectral range of concurrently analyzed radiation. Alternatively, a scanning procedure may be utilized to realize sequential analysis of incident optical radiation accommodated on a moderate expanse of limited focal surface. This is conventionally accomplished by performing relative mechanical rotations (or other repetitive motion) of the dispersive element(s) or their equivalent. Furthermore, a precise mechanical stage may be necessary to accomplish such scanning.

For a given degree of precision in resolution, range or other operational parameter; the dispersive instrument is typically expensive, fragile and demanding in care as such instruments may embody gratings, diode array spectrometers, and/or CCDs. The state of the prior art is reviewed in *Spectrochemical Analysis*, J. D. Ingle Jr. and S. R. Crouch (Prentice Hall, 1988).

Non-dispersive optical spectrometers are well known in the art. Ordinarily, these instruments rely upon optical filter element(s) which establish corresponding channels for the differential portions of the spectrum under analysis. As a practical matter, these instruments require a compromise between spectral resolution and spectral range analyzed since only a relatively small number of filter elements can typically be used.

The spectrometric instruments discussed above are necessarily designed for a specific spectral region. It is most often the case that instruments designed for use in the visible or the UV regions are so disparate in design that it is difficult to accommodate both such instruments in close proximity. Also, many optical materials that transmit well in the visible range do not transmit in the far ultraviolet (e.g. quartz is opaque to ultraviolet radiation having wavelengths below approximately 1500 angstroms.)

In many field applications there is need for an optical spectrometer which is extremely compact, inexpensive (even perhaps expendable), mechanically and environmentally rugged, and capable of covering a broad spectral region of relatively arbitrary specification.

It is long known in the prior art to employ a semiconductor's band-gap energy shift and the dependence of such shift upon the temperature of this semiconductor in order to implement optical pyrometry techniques. A more recent prior art technique for remote temperature measurement of a semiconductor materia is disclosed in U.S. Pat. No. 5,118,200 to Kirillov et al and commonly assigned herewith. This patent describes a temperature measuring apparatus and technique for its use with radiation heating of a substrate characterized by a temperature dependent band-gap energy wherein that wavelength corresponding to the point of inflection of the wavelength vs. transmission intensity histograph correlated to the real-time substrate temperature. This has been commercially implemented via POINT™ (Point-Of-INflection Thermometry) product utilizing this concept to provide non-contact, real-time measurement and control of semiconductor wafer temperature during wafer processing. POINT™ utilizes the transmission edge of the semiconductor's band-gap to operate as an optical step filter. This feature appears in combination with the determination of the wavelength corresponding to the band-gap energy dependence upon temperature. This combination can be characterized by an inflection point wherein the inflection point position is utilized to measure the instantaneous temperature of the semiconductor. POINT™ is used to locate the inflection point in order to determine the instantaneous wafer temperature.

An optical temperature gauge for determining the temperature of a semiconductor crystal having a temperature dependent band-gap energy is disclosed in U.S. Pat. No. 4,338,516 to Sharma which optically scans a crystal. The timing of the instantaneous wavelength passing over the band-edge wavelength at the transition edge is related to the instantaneous temperature of the crystal. Sharma uses the temperature dependent shift in the band-gap energy of a semiconductor, not to determine the spectrum of an incident light source, but again to determine the temperate of the semiconductor. The temperature sensing of the semiconductor is not iteratively determined in response to one applied temperature gradient as described in the invention herein disclosed. Rather, the wavelength of the incident light (e.g. a broad band light source such as a heated filament or a narrow band light source such as an LED) is iteratively cycled then directed through a sensor. To cycle a broad band light source, a scanning monochromator is used. To cycle the wavelength emitted from an LED, temperature is cycled, as the narrow wavelength emitted by an LED is very nearly given by the value of its band-gap. Therefore, only a narrow wavelength is directed through the sensor, not the complete spectrum as disclosed herein. This cyclical heating effectively sweeps the wavelength of the LED. In neither case is the sensor temperature interactively cycled nor is any attempt made to determine the spectrum of the incident light.

U.S. Pat. No. 5,213,985 to Sandroff et at, describes an optical monitoring technique for measuring temperature within a processing chamber wherein a semiconductor exhibiting temperature dependent band-gap energy distribution is optically excited to emit photoluminescence. Spectral resolution of the emitted photoluminescence provides a direct measure of the band-gap of the semiconductor and the temperature of the semiconductor is derived therefrom. The use of laser-excited photoluminescence from a semiconductor, such as GaAs, to measure its temperature or the temperature of a chamber in thermal contact with this semiconductor predates this patent. Such concepts are well known in the art. See for example, "High Temperature Band-to-Band Luminescence of GaAs and InP Excited by an Argon Ion Laser Beam" by D Kirillov and J Merz (J. Applied Physics, p. 4104, 1983) which discusses the utilization of luminescence as a probe to measure the temperature inside a laser spot. While the photoluminescence peak position versus temperature does reflect the dependance of the band-gap energy with temperature, a new spectrometer design is not the novel subject matter of this patent. Clearly a conventional spectrometer is there being used to measure the spectrum of the photoluminescence radiation emitted from the semiconductor.

Objects of the Invention

It is an object of the invention to provide a solid state spectrometer for acquiring an optical spectrum, e.g. determining relative intensity I as a function of $\lambda$, for incident radiation over a very wide range of incident wavelength, $\lambda$, which does not require dispersive nor collimating elements (e.g. lenses, gratings, ere) nor multi-element radiation detectors (e.g. CCDs, photodiode arrays, etc). Furthermore, this spectrometer does not operate by mechanical scanning, whether iterative or not.

It is a further object of this invention to provide such solid state spectrometer which is compact, durable and inexpensive for almost any field use.

SUMMARY OF THE PRESENT INVENTION

The present invention provides an optical spectrometer using an optical element made of a material which exhibits a sharp band-gap resulting in the entire incident optical spectral distribution above/below the cutoff wavelength (band-gap, band-edge or transmission edge), $T_r(\lambda)$, corresponding to the total radiation (limited only by the band-gap) is transmitted to a detector yielding a signal proportional to the total radiation transmitted by the optical element $I(\lambda)$. The mathematical integral corresponding to this transmitted spectrum is one datum of an integral distribution of the optical spectrum. Then, the band-gap is manipulated, e.g. by application of a temperature gradient, to incrementally translate the cutoff value for the transmitted radiation to higher/lower wavelengths providing a distribution, e.g. $T_r(\lambda,T)$. The sequence of optical intensity values, e.g. intensity ($I(\lambda)$) as a function of wavelength ($\lambda$),when mathematically integrated over transmission distribution of the cuttoff value, e.g. $T_r(\lambda,T)$ as a function of wavelength ($\lambda$) and temperature (T), yields an integral bias curve, $I(T)$, from which the differential spectrum, $dI(T)/dT$, is recovered by application of the operation of mathematical differentiation of the optical intensity.

A preferred mechanism for translating the cutoff wavelength of the optical element is a controlled heating/cooling of the optical element utilizing the joule (or peltier) effect, providing a temperature gradient. As resolution is determined principally by the sharpness of the band edge, alterations could be achieved e.g. by doping the semiconductor so as to broaden the band-edge.

Another conceivable embodiment would involve creating a temperature gradient in the semiconductor (having a temperature dependent band-gap) by passing a current through it; providing a heat sink at one end, then moving the incident light relative to the material to effectively change the temperature of the filtering element. By so doing, instead of using temperature versus time and taking the time differential; one would note temperature versus position and take the spatial differential. In this way, a space parameter rather than a time parameter is used to determine the temperature of the semiconductor.

While temperature dependency of the bandgap is herein utilized to realize the invention; other conveniently related dependencies, e.g. pressure, flow etc, might also be derived based upon these same principles as disclosed and discussed herein.

DETAILED DESCRIPTION OF THE DRAWINGS

Figure 3:
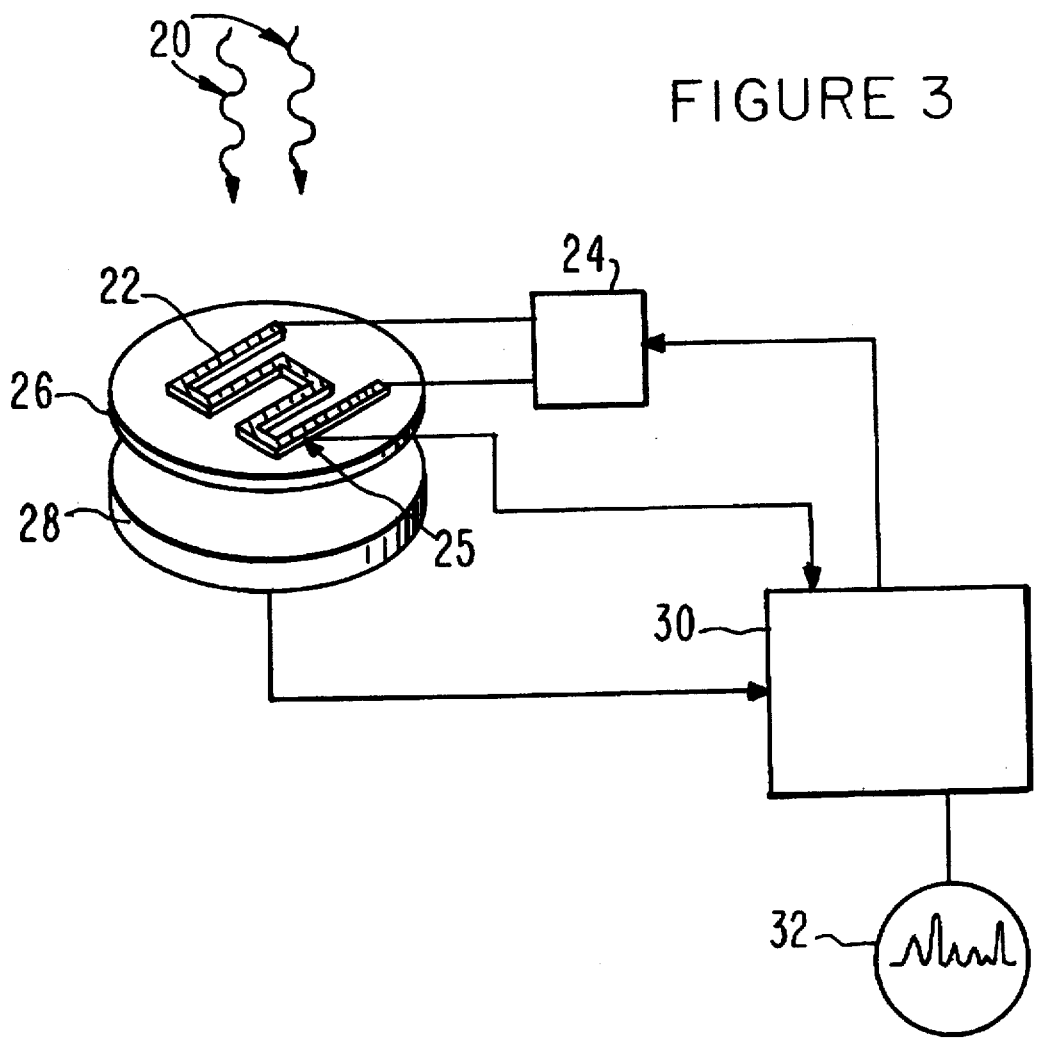

FIG. 3 exhibits a partial block diagram for a preferred embodiment of the present invention.

Figure 4:
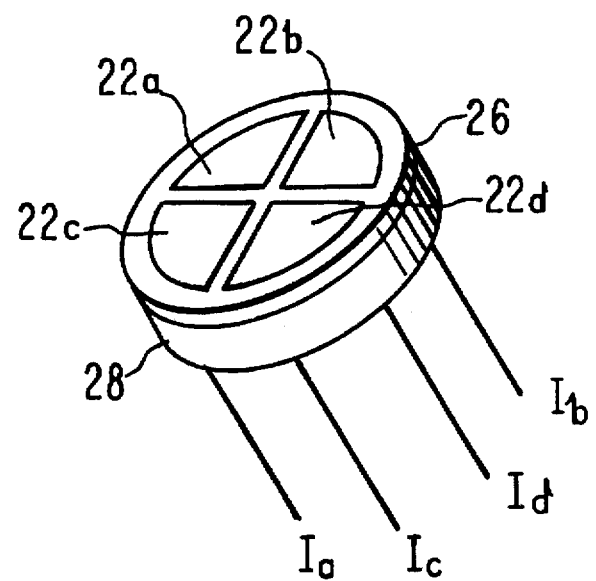

FIG. 4 shows a variation of the device of FIG. 3 utilizing multiple semiconductor films.

DETAILED DESCRIPTION OF THE INVENTION

The invention disclosed herein utilizes the temperature dependent shift of a semiconductor's band-gap as the dispersive element in a solid state spectrometer. It is because the transmission of light passing through a semiconductor exhibits this sharp step at the band-gap edge, that the technique disclosed herein can be carried out with very high spectral resolution. In effect, the semiconductor functions as a bandpass optical filter or discrimination whose pass energy is determined by its temperature.

Figure 1A:
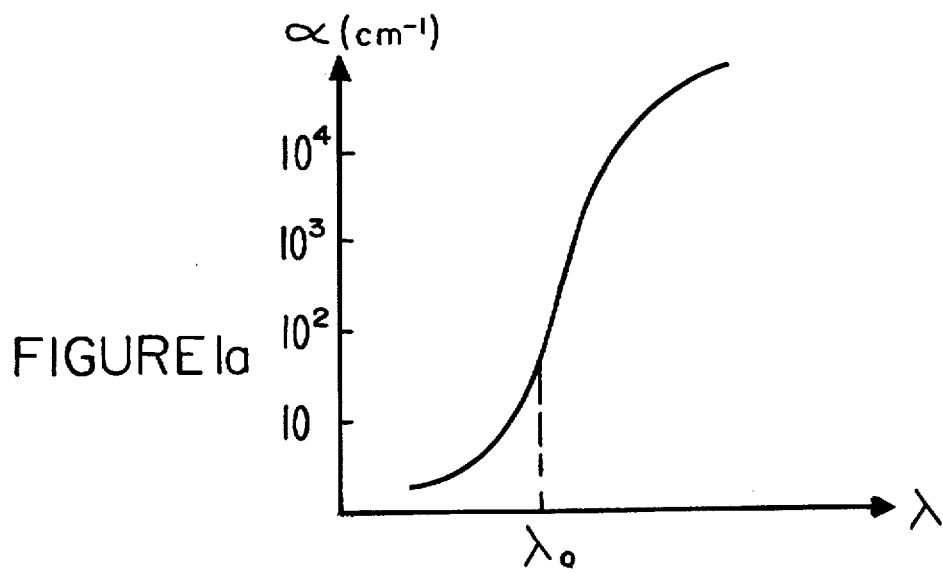
FIG. 1a shows typical behavior of the optical absorption constant for an arbitrary typical semiconductor.
Figure 1B:
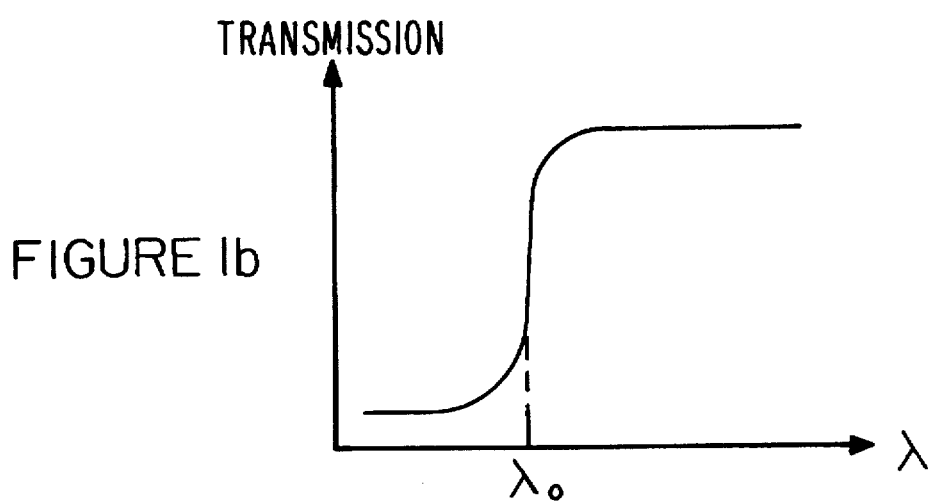
FIG. 1b shows the optical transmission temperature behavior for an arbitrary typical semiconductor.

The sharpness of this filtering relates to the fact that many common semiconductors, particularly those with a so-called "direct" band-gap, exhibit an optical absorption coefficient ($\alpha$) that rapidly increases for energies greater than the band-gap energy. For example, in GaAs, $\alpha$ exhibits substantially exponential dependence upon wavelength-increasing from below 10 cm$^{-1}$ to over 10,000 cm$^{-1}$ with a decrease in wavelength of only a few percent at room temperature (20 nm out of 900 nm). See FIG. 1a which illustrates the typical behavior of the optical absorption constant for an arbitrary semiconductor. Actual experimental data may be found in *Gallium Arsenide*, ed. J. S. Blakemore (American Inst. of Physics, N.Y. 1987), p. 25. As a result, the transmission of light through even a thin film of semiconductor behaves in a step function fashion as shown in FIG. 1b. Because the transmission function is already an inherently exponential function of $\alpha$, this behavior in effect exhibits a double exponential dependence of transmission on wavelength, resulting in an extremely sharp variation in transmission near the band edge, being "built-in" by the material properties of the semiconductor.

Figure 1C:
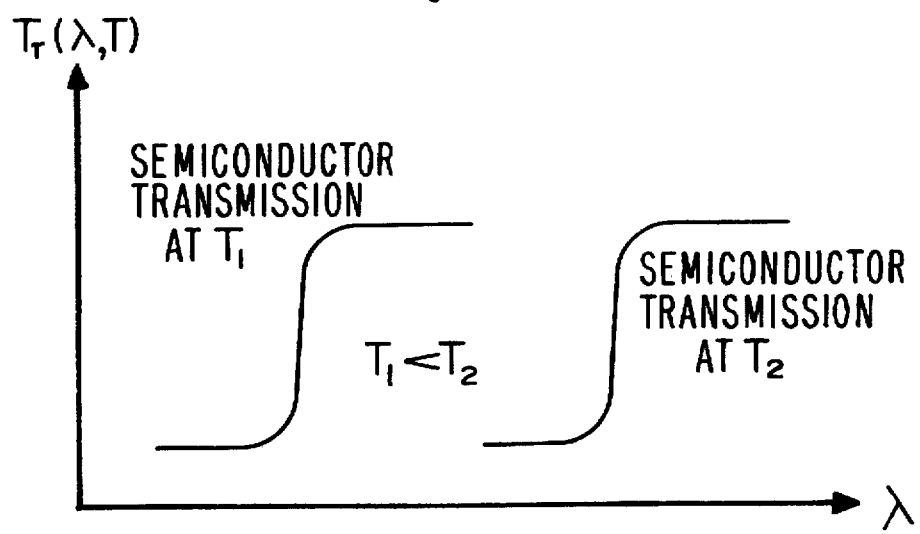
FIG. 1c illustrates the temperature dependence of the band-gap shift of an arbitrary typical semiconductor.

It is well know that semiconductors exhibit a sharp band-gap edge at a particular wavelength ($\lambda$); and that this band-gap edge wavelength ($\lambda_{bg}$) is a well-defined function of temperature. This temperature dependence is predominantly due to the thermal expansion of the semiconductor lattice, typically shifting to longer wavelength with increasing temperature. See FIG. 1c.

Given these properties of most semiconductors, the structure and function necessary to comprise a solid state semiconductor optical spectrometer is as follows: Preferably a thin film of semiconductor material is disposed onto a transparent substrate which may also serve as a heat sink for this film, in order that the film temperature can be quickly varied. The semiconductor material is chosen to have a band-gap in the spectral region of interest. The band-gap of a semiconductor ($E_g$) is strongly material dependent and can be varied by a factor of nearly 100 by a proper choice of material. Furthermore, the band gap of compound semiconductors can essentially be 'tuned' over a large range in energy by growing the material with a proper stoichiometry. Approximate band-gaps for a variety of materials at room temperature 300° K. are shown summarized in table I.

TABLE 1

| Semiconductor | Bandgap at 300K | | Bandgap at 900K | |
|---|---|---|---|---|
| $Hg_{0.8}Cd_{0.2}Te$ | 0.17 eV | 7.30 μm | | |
| InSb | 0.17 eV | 7.30 μm | 0.03 eV | 41.3 μm |
| PbTe | 0.20 eV | 6.20 μm | | |
| InAs | 0.36 eV | 3.44 μm | 0.20 eV | 6.2 μm |
| Ge | 0.67 eV | 1.85 μm | | |
| GaSb | 0.73 eV | 1.70 μm | 0.50 eV | 2.5 μm |
| $Hg_{0.4}Cd_{0.6}Te$ | 0.73 eV | 1.70 μm | | |
| Si | 1.10 eV | 1.10 μm | | |
| InP | 1.35 eV | 0.92 μm | 1.15 eV | 1.08 μm |
| GaAs | 1.42 eV | 0.87 μm | 1.10 eV | 1.1 μm |
| CdTe | 1.45 eV | 0.86 μm | | |
| $Al_{0.1}Ga_{0.9}As$ | 1.55 eV | 0.80 μm | | |
| $Al_{0.4}Ga_{0.6}As$ | 1.90 eV | 0.65 μm | | |
| CdS | 2.40 eV | 0.52 μm | | |
| ZnS | 3.54 eV | 0.35 μm | | |
| diamond | 5.40 eV | 0.23 μm | | |

The data in Table 1 is compiled from a variety of published sources [1–5]. The values given shouldbe considered approximate, since references can disagree by as much as 10%. Energy (eV) was converted to wavelength (μm) using the formula: wavelength=1.2398/energy. The 900K data was calculated using formulas given in ref. 5.

[1] S. Adachi, J. Appl. Physics 58(3), 1 Aug. 1985, pp. R1–R29.
[2] CRC Hnadbook of Chemistry and Physics, 71st edition (CRC Press), 1990–91, chapter 12, pp. 58–63.
[3] S. Rogalski and J. Piotrowski in *Progress in Quantum Electronics* (Pergamon Press), vol. 12, number 2/3, 1988, p. 153.
[4] *American Institute of Physics Handbook*, 3rd edition (McGraw-Hill), 1972, chapter 9, pp. 17, 24 and 63.
[5] *Heterostructure Lasers: Part B* (Materials & Operating Characteristics), eds. H. C. Casey and M. B. Panish (Academic Press 1978), chapter 5, p.9.

Figure 2A:
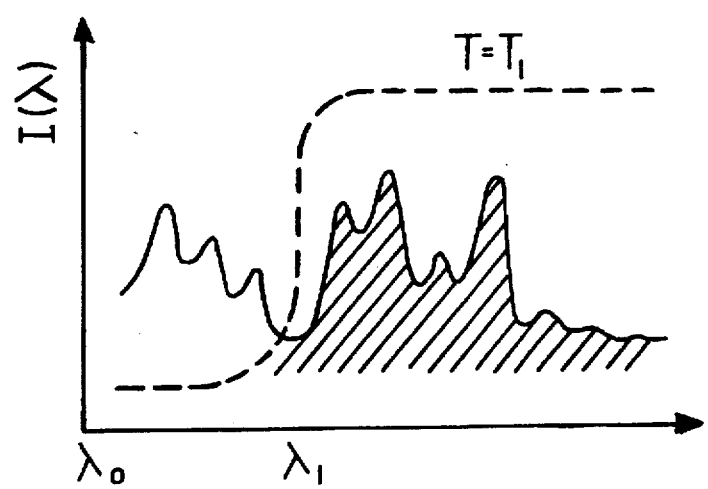
FIG. 2a shows the total radiation spectrum incident upon the semiconductor film and the cutoff characteristic at one value of T.
Figure 2B:
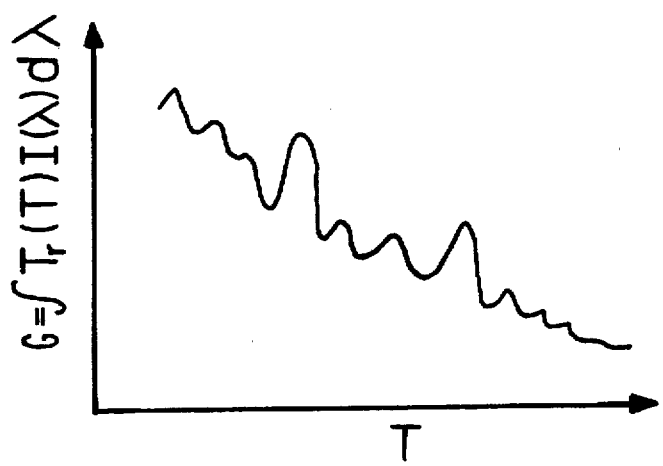
FIG. 2b shows an integral distribution of the optical radiation resulting from the transmitted optical intensity for a distribution of cutoff values.

The semiconductor material must be deposited to a thickness sufficient to absorb all incident radiation above the band-gap. The film is heated in a controlled manner during collection of the transmitted spectrum by a suitable broadband photodetector, e.g. CCD or photodiode, disposed behind the transparent substrate. In other words, a thermal gradient is applied to the semiconductor material. (Alternatively, a bulk semiconductor may be directly disposed over the photodetector). This temperature dependent transmission intensity spectrum is collected at a value $T_1$ of the bandgap controlling parameter. This quantity $T_r(\lambda,T_1)$ represents the integral of the transmitted radiation in the wavelength interval passed by the semiconductor film at $T_1$ (the shaded portion) as illustrated in FIG. 2a where the curve represents the total incident radiation. As the parameter T is systematically incremented over the values $T_i$, the resulting quantities $T_r(\lambda,T_i)$ are collected to yield the integral distribution of FIG. 2b. That is, the curve of FIG. 2b represents the quantity $$\int I(\lambda)T_r(\lambda,T_i)d\lambda$$

Figure 2C:
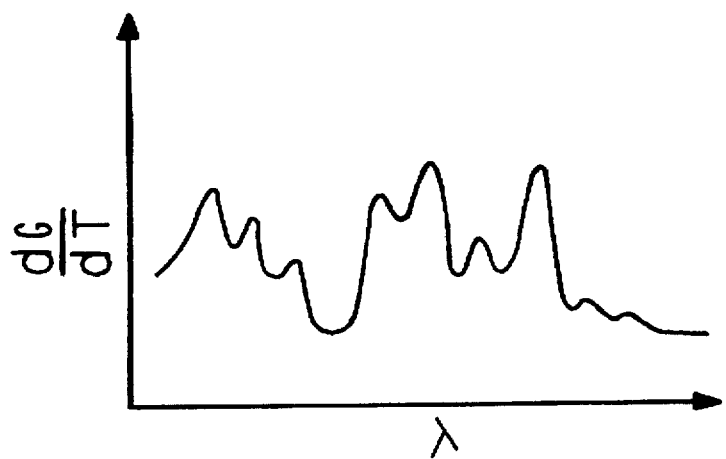
FIG. 2c shows the result of differentiation of the integral distribution of FIG. 2b.

Thereupon, the mathematically obtained derivative of the transmitted intensity is taken, which, given the known temperature dependence of the cutoff wavelength of the semiconductor film, is equivalent to the incident differential radiation intensity spectrum as a function of temperature as shown in FIG. 2c. The distribution obtained in FIG. 2c therefore corresponds to the incident spectral distribution of FIG. 2a. Thus, this solid-state semiconductor spectrometer determines the spectral intensity of radiation impinging upon the semiconductor material solely utilizing the thermal character of the semiconductor material itself.

The operating energy (or wavelength) of the disclosed spectrometer is determined by the bandgap energy of the semiconductor at its operating temperature. Fortunately, the bandgap of semiconductors (Eg) is strongly material-dependent and can be varied by a factor of nearly 100 by a proper material choice. For the spectrometer to function in a desired spectral range, a material with appropriate bandgap energy is chosen. At room temperature (300° K.), by way of example, semiconductors can be found with bandgap in the vacuum ultraviolet spectral region (e.g. diamond with Eg=5.4 eV or Si with Eg=1.1 eV), near-infrared (e.g. GaAs with Eg=1.42 eV or Ge with Eg=0.67 eV) and infrared (InSb with Eg=0.17 eV). In addition, the bandgap of compound semiconductors such as $Al_xGa_{1-x}As$ and $HgCd_{1-x}Te$ can be "tuned" over a large range in energy by growing the material with a proper stoichiometry (e.g. Eg=1.55 eV for $Al_{0.1}Ga_{0.9}As$ while Eg=1.90 eV for $Al_{0.4}Ga_{0.6}As$). Approximate bandgaps for a variety of materials at room temperature are summarized in Table 1 and illustrates that by picking a suitable material, spectra can be recorded over a very large range of energy from below=0.15 eV to above≈5.5 eV (i.e, from below≈2500 Åto≈8 μm or larger). While the absolute value of the bandgap is very sensitive to material choice, the effect of temperature on bandgap is remarkably similar for most materials—the bandgap showing a more or less linear decrease with increasing temperature on the order of $5\times10^{-4}$ eV per ° C. By way of illustration, Table 1 shows the bandgap expected for selected materials in the range of room temperature (20° C.≈300K) to 620° C .(900K). Hence by using GaAs in the spectrometer and varying temperature from 300–900K, spectra in the range of about 0.9–1.1 μm could be collected; and so on.

While not limited to any spectral range, for several reasons, an attractive application of the solid state spectrometer would be in the near IR region from about 3–12 μm.

The most highly developed, high quality growth technology (epitaxy by MBE and MOCVD) has been applied to thin films of III–V and II–VI alloys like $GaIn_{1-x}Sb$, $Ga_xIn_{1-x}As$, $PbSn_{1-x}Te$, $Hg_xCd_{1-x}Te$ whose bandgaps can be accurately positioned in the near IR by a proper choice of x. Since the starting wafers of choice (GaAs, PbTe, CdTe) have band gaps larger than those of the respective films grown on them, they serve as the transparent substrate desired for the spectrometer.

The energy gaps of semiconductors typically decreases with temperature by≈0.5 meV/° K. Because of this, a 2°–5° K. change in temperature can result in a shift of only a few $cm^{-1}$ should be achievable at≈5 μm wavelength—which is comparable to the state of the art for conventional FTIR spectrometers.

FIG. 3 illustrates a preferred embodiment of the invention wherein incident radiation 20 is incident upon a resistively heated thin semiconductor film 22. This may be a patterned form to provide the desired heating uniformity over the selected optically sensitive area. The film is deposited on transparent substrate 26 which is selected to provide a heat sink for the film in order that the temperature may be varied with minimal thermal response time. The film is selected to have a bandgap in the region of interest and to be adequately thick, for example, 2 to 3 µm, while thin enough to exhibit an adequately rapid thermal response time.

The film 22 is heated by temperature controller 24 which is in turn responsive to thermocouple (or equivalent) temperature sensor 25 and system controller 30. It is understood that a plurality of such temperature sensors may be provided. A broadband photodiode 28 views the film and provides a signal proportional to the total intensity of the radiation transmitted through the film and substrate. This signal is processed by standard electronics as understood by those of skilled in the art and directed to system controller 30. Controller 30 incorporates a digital processor for storing and manipulating the optical data and for providing signals to the temperature controller 24 to change the temperature of the semiconductor film 22. Controller 30 accumulates the integral spectrum through the appropriate variation of temperature and then performs the differentiation to recover the incident optical spectrum which may be displayed or otherwise presented by device 32.

The invention may be practiced with a bulk semiconductor material instead of a film.

In an alternate embodiment, a plurality of different semiconductor films are arranged to be observed by a common photosensor 28 as shown in FIG. 4 wherein the labels correspond with the labels of FIG. 3 in relevant detail. The different semiconductor films exhibiting a corresponding diversity of bandgap behaviors in a common temperature range may be selected to yield separate spectral representations which may be arranged to provide for a wider spectral range than would be achievable by any one semiconductor film. The several signals $I_a$, $I_b$, $I_c$, $I_d$ carry the information derived from the optical intensity passed by the respective semiconductor films $22_a$, $22_b$, $22_c$, $22_d$. A convenient way of providing a plurality of bandgaps would be to deposit a teninary material such as $Al_xCa_{1-x}As$ and to vary the Al fraction x in each film—the bandgap being a strong function of x.

The invention may be embodied in several forms without departing from the spirit of the invention and the essential characteristics pertaining thereto. The present embodiment is illustrative only and not restrictive. In particular, the band gap control parameter need not be temperature, but may include any of a variety of physical variables which affect the band gap. The scope of the invention is defined by the claims rather than by description preceding them and all changes which fall within the scope of the claims or the equivalence of such claims are intended to be embraced by the following:

What is claimed is:

1. The method for determining the spectrum of incident radiation comprising the steps of
   (a) providing at least one layer of material, said material having a band gap energy, said layer being deposited onto a transparent substrate having a thickness sufficient to absorb all incident radiation above the band gap energy,
   (b) controllably heating said layer in order to impose a temperature gradient across said material while projecting incident radiation through said layer,
   (c) measuring the intensity of a portion of said incident radiation transmitted through said layer as a function of said temperature gradient across said material,
   (d) differentiating said intensity with respect to temperature to obtain the differential intensity as a function of wavelength.

2. The method for determining the differential spectral distribution of radiation incident upon a layer of material, said material characterized by a temperature dependent band gap energy, said layer being deposited onto a substrate, said substrate substantially transparent to said radiation, said layer having thickness sufficient to transmit only incident radiation having energy greater than said band gap, comprising:
   controlling said layer to achieve a plurality of successive temperatures,
   directing said radiation upon said layer,
   measuring intensity of radiation transmitted through said layer for each of said plurality of temperatures of said layer,
   determining a corresponding plurality of transmitted intensities in functional relationship to said plurality of temperatures,
   analyzing said functional relationship in order to substantially provide a mathematical derivative of said functional relationship of said intensity as a function of said corresponding temperatures whereby the,
   differential change of total radiation intensity transmitted by said material as a function of temperature is directly identifiable with said spectral distribution.

3. Apparatus for determining the spectrum of incident radiation comprising:
   a film of material, said material exhibiting a band gap and being of such thickness to absorb all incident radiation above the band gap, said material being deposited onto a radiation transparent heat sink substrate cooperating therewith to provide adequate thermal response:
   means for heating said film so as to maintain a thermal gradient across said film,
   means for detecting radiation intensity at a plurality of temperatures corresponding to said thermal gradient,
   means for measuring transmitted intensity for each temperature of said plurality of temperatures,
   means for collecting a plurality of intensity measurements corresponding to said plurality of temperature measurements,
   means for determining a differential change in intensity corresponding to a differential change in temperature in order to determine a derivative function thereof.

4. The method of acquiring a differential distribution of optical radiation, comprising the steps of:
   (a) passing incident radiation through an optical discrimination element, whereby radiation below a cut-off wavelength is not transmitted, said cut-off wavelength being temperature dependent,
   (b) detecting and recording the total intensity of transmitted radiation,
   (c) causing the cut-off wavelength to change controllably in response to a changing the temperature of said optical discrimination element,
   (d) repeating the steps (a) through (c) to obtain the total intensity of transmitted radiation as a function of cut-off wavelength,
   (e) differentiating the total intensity of transmitted radiation as a function of cut-off wavelength with respect to cut-off wavelength whereby the distribution of optical radiation is obtained.

* * * * *